United States Patent
Chen et al.

(10) Patent No.: US 9,746,090 B2
(45) Date of Patent: Aug. 29, 2017

(54) CONTAINER, CONTAINING DEVICE AND METHOD FOR TAKING OUT CONTAINED PRODUCT

(71) Applicant: Beijing Red-Sea Tech Co., Ltd., Beijing (CN)

(72) Inventors: Zengxin Chen, Beijing (CN); Shumin Luo, Beijing (CN)

(73) Assignee: Beijing Red-Sea Tech Co., Ltd., Beijing (CN)

(\*) Notice: Subject to any disclaimer, the term of this patent is extended or adjusted under 35 U.S.C. 154(b) by 101 days.

(21) Appl. No.: 14/430,821

(22) PCT Filed: Sep. 26, 2013

(86) PCT No.: PCT/CN2013/084293
§ 371 (c)(1),
(2) Date: Mar. 24, 2015

(87) PCT Pub. No.: WO2014/048341
PCT Pub. Date: Apr. 3, 2014

(65) Prior Publication Data
US 2015/0240959 A1    Aug. 27, 2015

(30) Foreign Application Priority Data
Sep. 27, 2012  (CN) .......................... 2012 1 0366931

(51) Int. Cl.
*B65D 83/00* (2006.01)
*F16K 15/02* (2006.01)
(Continued)

(52) U.S. Cl.
CPC .............. *F16K 15/02* (2013.01); *B65D 25/38* (2013.01); *B65D 81/24* (2013.01); *B65D 81/245* (2013.01);
(Continued)

(58) Field of Classification Search
CPC ..... F16K 15/02; F16K 11/0716; B65D 25/38; B65D 81/24; B65D 81/245
(Continued)

(56) References Cited

U.S. PATENT DOCUMENTS 2,327,285 A * 8/1943 Opitz .................. A47G 19/183
                                                  215/3
7,051,901 B2 * 5/2006 Hickert .................... C12H 1/12
                                                  222/1

(Continued)

FOREIGN PATENT DOCUMENTS

CN    202449415    9/2012
CN    203173141    9/2013
(Continued)

OTHER PUBLICATIONS

International Search Report issued in PCT/CN2013/084293, mailed on Jan. 2, 2014 (2 pages).

*Primary Examiner* — Patrick M Buechner
*Assistant Examiner* — Jeremy W Carroll
(74) *Attorney, Agent, or Firm* — Osha Liang LLP

(57) ABSTRACT

A container and method for taking out contained product. The container comprises a container body, a pressure transfer channel, a control valve, a liquid taking channel and an outflow channel, the control valve contains a moving part. The moving part is at different positions along with variation of pressure applied to a variable pressure part, and connection and disconnection of the channels which between the pressure transfer channel and the outflow channel and between the liquid taking channel and the pressure transfer channel are determined by three positions of the moving part. The container can quantitatively take out contained product, is simple in structure and avoid the product to be oxidized or polluted.

12 Claims, 8 Drawing Sheets

(51) Int. Cl.
    *B65D 81/24*     (2006.01)
    *B65D 25/38*     (2006.01)
    *F16K 11/07*     (2006.01)
    *F16K 17/04*     (2006.01)
    *G01F 11/16*     (2006.01)

(52) U.S. Cl.
    CPC ...... *F16K 11/0716* (2013.01); *F16K 17/0473* (2013.01); *G01F 11/16* (2013.01)

(58) Field of Classification Search
    USPC .............................. 222/401, 402, 400.8, 209
    See application file for complete search history.

(56) References Cited

U.S. PATENT DOCUMENTS

2009/0308898 A1* 12/2009 Polano ................ B65D 1/14
                                                              222/401
2016/0002023 A1* 1/2016 Chen ................... B67D 7/0205
                                                               222/1

FOREIGN PATENT DOCUMENTS

| JP | 2004519392 | 7/2004 |
| WO | 2010001582 | 1/2010 |

* cited by examiner

CONTAINER, CONTAINING DEVICE AND METHOD FOR TAKING OUT CONTAINED PRODUCT

BACKGROUND

Technical Field

The present invention relates to a container, a containing device and a method for taking out a contained product, and in particular to a container and a containing device from which a contained product is taken out conveniently, quickly and quantitatively, and a method for taking out a contained product in a container.

Related Art

In daily life, people may use many liquids or pastes, such as washing liquids, sterilizing liquids, shampoos, body washes, toothpastes, soy, vinegar, salad dressing, honey, edible oil and liquid medicines. Containers containing these liquids or pastes are mostly disposable articles, which often only pay attention to labeling and beautiful effects but pay little attention to how to conveniently take out the contained products, and an inverted toppling method and a method for taking out by a pressing pump are commonly used. Problems existing in the inverted toppling method have been fully described in other literatures, for example, the method cannot determine the quantity, is easy to pollute or waste the contained product, is inconvenient in use, or is prone to oxidation in contact with the air; methods for taking out hand sanitizer and shampoos and some simple transformed taking-out methods also have some disadvantages:

1. The amount of a liquid taken out by using a pressing pump cannot be controlled precisely. A force generated by downward press of a pressing device is not constant, so the amount of the liquid taken out often can only be measured with the number of presses, and the amount of the liquid taken out cannot be controlled precisely.

2. Viscosity and consistency of the liquid taken out cannot be too high. The pressure drop of the pressing device is big, if viscosity and consistency of the liquid are too high, the liquid cannot be sucked to a high level and cannot be taken out; it is less conducive to further forming spray or foam by the contained product.

3. The manufacturing cost is high. The pressing device has a complex structure, two check valves are generally required, which need to be produced and assembled separately, necessary parts such as container walls are not utilized, and thus the manufacturing cost is high.

4. Continuous taking-out is impossible. The pressing device can only take out a contained product in a limited space near a straw outlet each time, after the contained product in the space is taken out, another contained product can be taken out only after being inhaled from the container below, and thus the liquid can only be taken out in small volume and intermittently, and continuous taking-out is impossible.

A simple and practical container is required in people's life, so that each taking-out can be controlled at will and less affected by the outside air or impurities.

SUMMARY

To solve the problem in the prior art that there are no container and containing device from which a contained product is easily, practically and conveniently taken out, the present invention provides a container, the container including a container body and further including a pressure transfer channel, a control valve, a liquid taking channel and an outflow channel;

the pressure transfer channel transferring to the control valve variation of positive and negative pressures applied to the pressure transfer channel by an external variable pressure part;

the control valve including a valve body and a valve core, and under the positive and negative pressures, the valve core axially reciprocating in the valve body;

one end of the valve body being in communication with the pressure transfer channel, the other end being provided with a pressure relief opening, and sidewalls being provided with at least two interfaces; outer sides of the interfaces being respectively in communication with the outflow channel and the liquid taking channel, and inner sides leading to an outer side face of the valve core;

the valve core being provided with an internal channel, an outer-end opening of the internal channel being in communication with the pressure transfer channel, and an inner-end opening being located on the outer side face of the valve core;

the valve core, under the positive pressure, moving to a position where interfaces through which the inner-end opening is in communication with the outflow channel are connected, under the negative pressure, moving to a position where interfaces through which the inner-end opening is in communication with the liquid taking channel are connected, and in the absence of pressure, moving to a position where the inner-end opening and interfaces on the valve body are not connected;

one end of the liquid taking channel being in communication with the corresponding interface on the valve body, and the other end leading to the bottom inside the container body; and one end of the outflow channel being in communication with the corresponding interface on the valve body, and the other end leading to the outside of the container body.

The valve core of the container is at different positions in the valve body along with variation of the pressure applied by the external variable pressure part; connection or disconnection of channel between the pressure transfer channel and the outflow channel and channel between the liquid taking channel and the pressure transfer channel are determined by the position of the valve core:

when the external variable pressure part applies a positive pressure, the valve core moves to one end in the control valve, and at this time, the channel between the pressure transfer channel and the outflow channel is connected while the channel between the liquid taking channel and the pressure transfer channel is disconnected;

when the external variable pressure part applies a negative pressure, the valve core moves to the other end in the control valve, and at this time, the channel between the liquid taking channel and the pressure transfer channel is connected while the channel between the pressure transfer channel and the outflow channel is disconnected; and when the external variable pressure part applies no pressure, the valve core moves to the middle portion in the control valve, and at this time, the channel between the pressure transfer channel and the outflow channel and the channel between the pressure transfer channel and the liquid taking channel are all disconnected. The valve core can return to the middle portion in the valve body by installing an elastic part, by using a magnetic element, or by means of gravity, buoyancy or positive and negative pressures.

The container has a simple structure, enables mass production, does not have too precise requirements for a product structure, can reduce the manufacturing cost, does not have any excessively protruding portions, and facilitates packing and transportation. After a combination with the external variable pressure part in use, the contained product can be conveniently and quickly taken out at will.

Compared with the foregoing manners of taking out by pressure, such as the pressing pump, by means of a control valve, the container has the following advantages: 1. the structure is simpler, reducing the manufacturing cost; 2. it is more durable, and a fault does not easily occurs after repeated use; 3. the channel diameter of the control valve is larger, reducing the pressure drop in the whole taking-out process, and making the taking-out easier, which also makes it possible to take out viscous liquids such as pastes; 4. the control valve has better sealing performance, can make the taking-out easier and quantitative determination more accurate; and 5. the amount of single taking-out is great, the contained product in the whole pressure transfer channel can be taken out, and ordinary consumers basically realize stepless continuous taking-out.

Compared with methods of taking out by means of multiple other check valves, the taking-out system of the container has a simpler structure and a lower manufacturing cost, is more durable, and has a larger channel communication diameter and better sealing performance on the whole.

The control valve is in communication with the liquid taking channel, the pressure transfer channel and the outflow channel, and controls connection or disconnection of two channels between the pressure transfer channel and the outflow channel and between the liquid taking channel and the pressure transfer channel, its structure is different from an ordinary valve or a valve combination, and the control valve has a simple structure and convenient operation and is very suitable for containers for taking-out under variable pressure.

For the container, the pressure transfer channel is connected to the control valve and the external variable pressure part, and its internal pressure periodically varies with the taking-out process of the contained product. When the contained product is taken out through pressurization, the pressure in the pressure transfer channel becomes larger, and the contained product in the channel flows outwards under the pressure; after the taking-out, due to the action of the external variable pressure part, a negative pressure occurs in the pressure channel, the contained product in the container body enters the pressure transfer channel from the liquid taking channel, the pressure is balanced, and the container is ready for next taking-out.

The control valve for the container has a simple structure, requires no intervention from an external force, and can automatically change directions along with variation of the pressure in the pressure transfer channel in the taking-out process. The valve core of the control valve has three positions, where the position on one end enables connection between the liquid taking channel and the pressure transfer channel and disconnection between the pressure transfer channel and the outflow channel; the position in the middle enables disconnection between the pressure transfer channel and the outflow channel and between the pressure transfer channel and the liquid taking channel; and the position on the other end enables connection between the pressure transfer channel and the outflow channel and disconnection between the liquid taking channel and the pressure transfer channel. Such a control valve is different from the structure or use of other conventional control valves, the structure of the control valve is simpler and more durable, has a larger channel communication diameter and better sealing performance on the whole, and can be used conveniently and determine quantity accurately.

For the container, the pressure transfer channel has multiple functions, can transfer variation of the pressure applied by the external variable pressure part, is a place where a large number of contained products to be taken out are stored, and is also a main part that measures the volume of the contained product flowing out of the outflow channel.

For the container, the variable pressure part is separated from the container and can be installed to the container when needing to be used. Such a separate structure is conducive to reducing the manufacturing cost, facilitates packing and transportation, also helps consumers to recycle the variable pressure part, reduces the product price, and avoids unnecessary material waste and pollution.

For the container, the body of the pressure transfer channel may be located outside the container body or on an outer wall, and a channel wall is a transparent wall marked with scales thereon. For the container, the advantages of the pressure transfer channel at least include the following points: 1. pressure can be transferred as required, to make transfer of the pressure affected by the shape of the channel as little as possible and make the design of the shape of the container freer; 2. the pressure transfer channel is transparent and located outside the container body or on an outer wall, so that movement of a contained product or marker (e.g., a piston) therein can be observed directly, which is conducive to measuring the volume of movement of the contained product; 3. a starting point of movement of the contained product in the pressure transfer channel can be fixed, and therefore, measurement of the volume of the product taken out is simpler, and if the volume of the product flowing out is measured in the outflow channel, it is necessary to additionally set a starting point and a movement reference, and the structure is more complicated.

The container may be provided with an indicating device synchronously moving with a liquid in the pressure transfer channel. The indicating device is used for directly and conveniently indicating the volume of the contained product flowing out.

For the container, internal diameters of the internal channel, the interfaces and the liquid taking channel or the outflow channel may be substantially the same. In the prior art, it is difficult to take out liquids or pastes with great consistency or viscosity, with the reason that pressure drop of the whole channel in the taking-out process is very great. Making the internal channel, the interfaces and the liquid taking channel or the outflow channel connected in series and their diameters substantially the same helps to reduce the pressure drop, and the liquids or pastes with great consistency or viscosity can be taken out upon application of a smaller force. For a liquid to be taken out in a spray shape, greater pressure is required at a nozzle, and serial connection and the same diameter can help to achieve that.

For the container, the container body may have a plurality of spaces therein, respectively containing different contained products; each space is in communication with the corresponding interface on the valve body through a respective liquid taking channel; and the interfaces in communication with the liquid taking channel are located on the same radial plane. The container with such a structure enables simultaneous taking-out of a mixture of multiple contained products before use, and prevents undesired changes of the contained products caused by too early mixing.

Further, for the container, volume ratios of the plurality of spaces in the container body may be correlated with cross-sectional area ratios of respective corresponding interfaces on the valve body. Taking-out and mixing of multiple mixtures are realized in proportion according to different sizes of cross-sectional areas of set interfaces of the spaces on the control valve.

For the container, the container body may have a check valve only allowing gas to enter or the volume of the container body becomes smaller as a contained product is taken out. This can prevent external gas from entering in large quantity, and prevent the external gas from polluting or oxidizing the contained product.

For the container, the pressure transfer channel may be internally provided with a piston separating a contained product from a pressurized medium. This can prevent the contained product from being mixed with or polluting the pressurized medium (gas or liquid) in the variable pressure part. Meanwhile, due to incompressibility of the volume of the liquid, a movement distance of the piston can be used to refer to the volume of the contained product flowing out of the outflow channel.

For the container, the inner-end opening of the valve core may be an annular slot. The valve core may rotate in the valve body when moving axially, so that the annular slot can prevent non-correspondence between the inner-end opening and the interface caused by rotation of the valve core.

Further, for the container, a plurality of channels in communication with each other may be provided between the internal channel and the annular slot. The plurality of channels can reduce the weight of the valve core, reduce adverse effects brought about by the too large weight of the valve core; also can prevent blockage of the internal channel, and reduce pressure drop in the channel.

Further, for the container, two sides of the annular slot of the valve core may be provided with seal rings. The seal rings can prevent the contained product from passing between the inner side face of the valve body and the outer surface of the valve core.

For the container, the interfaces in communication with the outflow channel may be located on one end of the valve body close to the pressure transfer channel. When the interfaces in communication with the outflow channel are located on one end of the valve body close to the pressure transfer channel and gas appears in the pressure transfer channel and the valve body, pressurization to the end can discharge the gas from the outflow channel.

For the container, the control valve may be internally provided with an elastic part, and the elastic part enables the valve core to return to the position where the inner-end opening of the valve core and the interfaces on the valve body are not connected. Proper use of the elastic part may make each operation feel better, and may also be ready for next operation.

Further, for the container, the elastic part may be a spring located at an end portion of the valve core. In this manner, the spring is easy to install and the valve core can return to the middle position timely.

For the container, the number of the inner-end opening may be one or two. If the number of the inner-end opening is one, the structure is simple; and if the number of the inner-end opening is two, different inner-end openings can be designed according to different interfaces.

For the container, the valve body may be internally provided with a blocking device, to block the valve core from continuously moving after the inner-end opening communicates with the corresponding interface due to the positive and negative pressures. The blocking device can prevent the valve core from continuously moving after communicating with the interface to be staggered from the interface, making the positive and negative pressures used for pushing the contained product to move towards the outside of the container body or within the pressure transfer channel after the valve core communicates with the interface.

For the container, the pressure relief opening may lead to the outflow channel. The pressure relief opening leads to the outflow channel, which, firstly, can avoid an error caused by movement of the valve core when the volume of quantitative taking-out is read through the pressure transfer channel (the error is equal to the outflow at the pressure relief opening), and secondly, can drive a small amount of the contained product in the outflow channel to reflow when the valve core returns after the contained product is taken out, to prevent the contained product at the outlet of the outflow channel from dripping to cause pollution and waste.

The container may further include a variable pressure part that makes variation of positive and negative pressures generated in the pressure transfer channel. Integration of production and sales of the variable pressure part, the pressure transfer channel, the control valve, the outflow channel and the container body helps to ensure airtightness between the variable pressure part and the pressure transfer channel, and is conducive to forming the positive and negative pressures.

Further, for the container, the variable pressure part may be an airbag with a springback function or a piston that can be pushed or pulled in the pressure transfer channel. The airbag with a springback function will automatically rebound after pressurization, generate a negative pressure, and is easy to operate. For the variable pressure part which is a piston that can be pushed or pulled, a movement distance of the piston can be used to represent the volume of the contained product flowing out, and it is also feasible that the operating part is closer to the reading, which is more in line with the habit of operation.

Furthermore, for the container, the airbag may have a port in communication with the outer atmosphere, and the port is provided with a valve having a switch function. The port and the valve are used for removing excessive gas in the pressure transfer channel.

In a word, the container overcomes various problems existing in the container of the prior art and have the following advantages such as the container saves materials, prevent leakage, is easy to use, can be reused, is portable to take, is not easy to damage, has good reproducibility, prevents product pollution, saves the contained product, enables precise taking-out, enables taking-out of contained products with great viscosity and consistency, has a simple structure, is practicable, not prone to damage and widely used. Moreover, the container has greater capacity, can be recycled, can reduce applications of various packaging such as plastics, and is helpful to reduce the pressure of environmental pollution.

In another aspect, the present invention further provides a containing device, including the pressure transfer channel, the control valve, the liquid taking channel and the outflow channel. Under some circumstances, separate sales of the containing device can facilitate consumers to replace and take out the container in free combinations.

The present invention further provides a method for taking out a contained product in a container, the container used consisting of a variable pressure part, a pressure transfer channel, a control valve, a liquid taking channel and an outflow channel, where the variable pressure part, the pressure transfer channel and the control valve are in communication with each other in sequence, and the liquid taking channel and the outflow channel are connected with side faces of the control valve; the method including:

A. pressurizing the pressure transfer channel by using the variable pressure part, to push a valve core in a valve body to move, so that the control valve communicates with the pressure transfer channel and the outflow channel, and the contained product in the pressure transfer channel and the control valve flows outwards along the outflow channel;

B. stopping pressurizing the pressure transfer channel after a required amount of the contained product is taken out, and the contained product stopping flowing out;

C. making the valve core in the control valve return to a position where the pressure transfer channel and the outflow channel as well as the liquid taking channel and the pressure transfer channel are disconnected;

D. decompressing the pressure transfer channel by using the variable pressure part, to push the valve core in the valve body to move, so that the pressure transfer channel communicates with the liquid taking channel and the contained product in the container body flows out into the pressure transfer channel;

E. after decompression stops, the contained product in the container body stopping flowing out into the pressure transfer channel; and F. making the valve core in the control valve return to the position where the pressure transfer channel and the outflow channel as well as the liquid taking channel and the pressure transfer channel are disconnected.

Further, in the taking-out method, steps C, D, E, and F are automatically completed after completion of steps A and B.

Such a taking-out method is easy to operate and easy to use, enables accurate quantitative determination, basically realizes stepless continuous taking-out, can be applied to liquids or pastes with greater viscosity and consistency, and can also be applied to liquids to be taken out in a spray shape.

DETAILED DESCRIPTION

Embodiment 1

Figure 1:
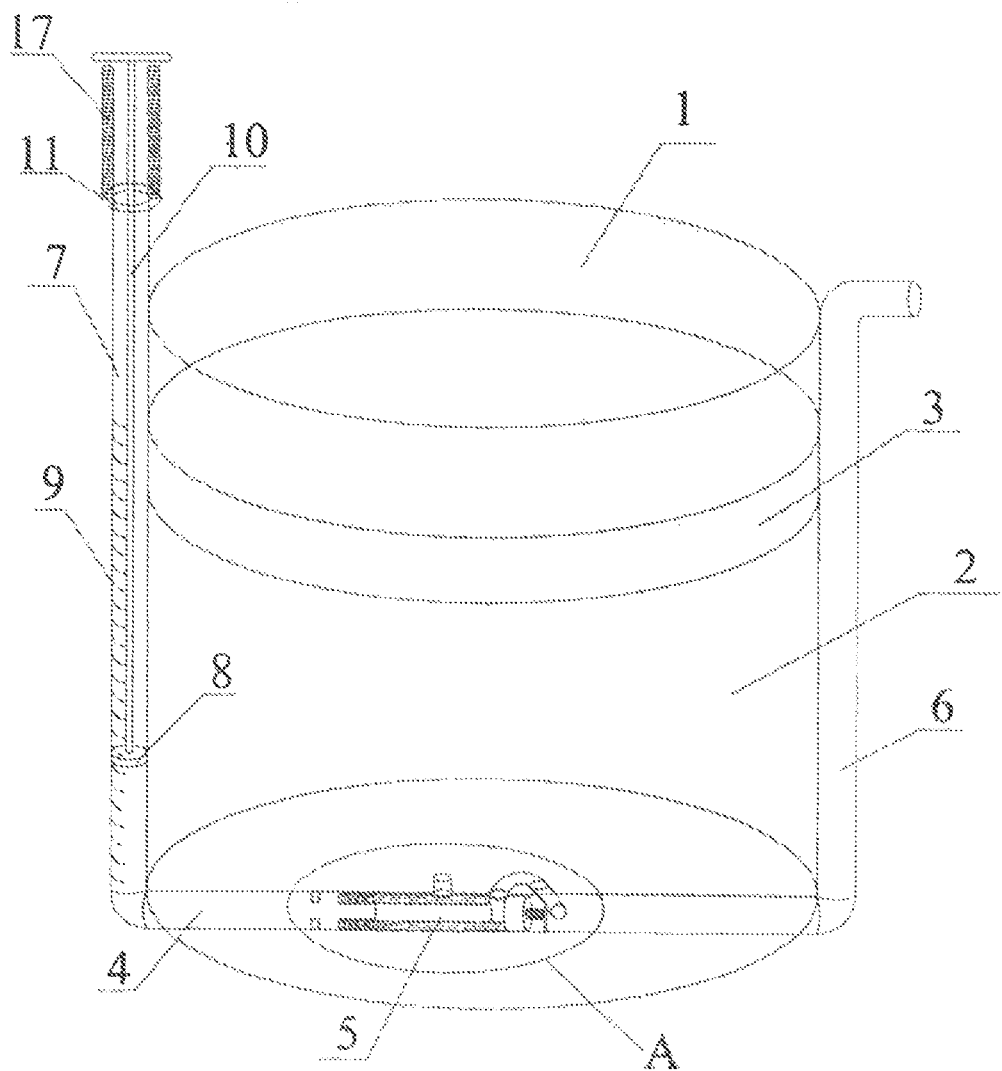
FIG. 1 is a schematic structural view of the container in Embodiment 1.
Figure 2:
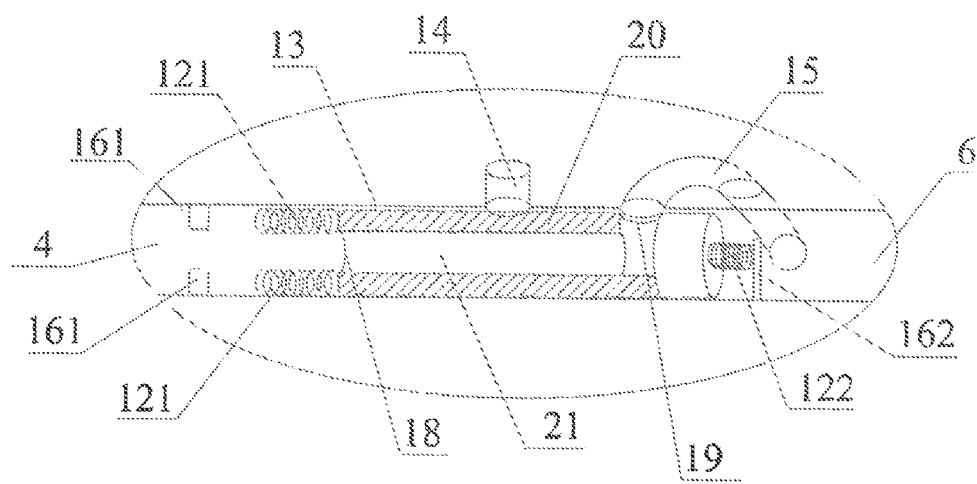
FIG. 2 is a partially enlarged view of A in FIG. 1.
Figure 3:
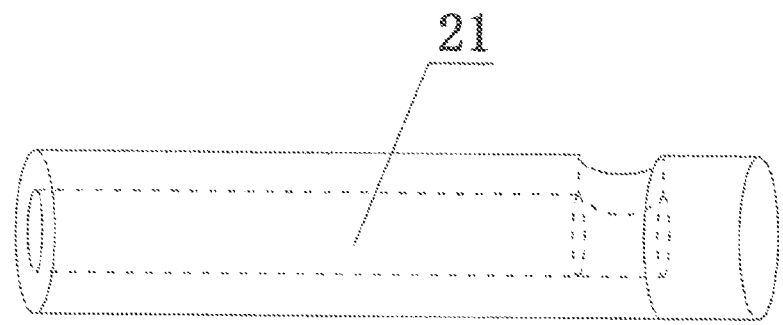
FIG. 3 is a schematic structural view of the valve core (moving part) in FIG. 1.

As shown in FIG. 1, FIG. 2 and FIG. 3, FIG. 1, FIG. 2 and FIG. 3 illustrate a container according to Embodiment 1 of the present invention. The body 1 of the container is cylindrical, containing a liquid product 2, above the liquid product is a piston 3, and the piston 3 can move up and down in the body 1. On walls of the body 1, channels formed by sequential connections between a variable pressure part 7, a pressure transfer channel 4, a control valve 5 and an outflow channel 6 are attached to sidewalls and bottom walls of the body.

The variable pressure part 7 includes a transparent channel 9 with scales, a piston 8 inside the transparent channel 9 and an operating lever 10 connected to the piston 8 to extend outside the transparent channel 9. The operating lever 10 can drive the piston 8 to move up and down along the transparent channel 9, and a ring 11 blocks the piston 8 from moving up and falling off. The transparent channel 9 of the variable pressure part 7 is in a thread sealed connection with the pressure transfer channel 4. A spring 17 can push the operating lever 10 to bounce after the operating lever 10 stops pressurization, making the piston 8 return to the starting position.

The control valve 5 includes a peripheral seal cover 13 (i.e., a valve body) and an internal moving part 20 (i.e., a valve core). The tail end of the pressure transfer channel 4 is in seamless communication with the peripheral seal cover 13 of the control valve 5, the peripheral seal cover 13 is similar to a part of the pressure transfer channel 4, and the moving part 20 can move left and right in the peripheral seal cover 13 under the pressure transferred by the pressure transfer channel 4. An internal channel 21 of the moving part 20 has two openings, an opening 18 (i.e., an outer-end opening) and an opening 19 (i.e., an inner-end opening). The opening 18 leads to the pressure transfer channel 4, the opening 19 is in the peripheral seal cover 13, when the opening 19 of the internal channel 21 inside the control valve 5 moves to a corresponding position, the opening can communicate with a pipeline 14 (i.e., a liquid taking channel) in communication with the bottom of the container body 1 or a pipeline 15 in communication with the outflow channel 6 respectively through corresponding interfaces on the peripheral seal cover 13, and when the opening 19 is in other positions, that is, the opening 19 does not communicate with the pipeline 14 or the pipeline 15, the opening 19 is sealed by the peripheral seal cover 13. Two ends of the moving part 20 are each provided with a spring 121 and a spring 122 whose one end is fixed to the moving part 20 and the other end is free. Walls of the pressure transfer channel 4 and the outflow channel 6 are provided with a baffle 161 and a baffle 162. When the free end of the spring 121 or the spring 122 contacts the baffle, resistance blocking the moving part 20 of the control valve 5 from continuously moving will be generated. After pressure generated by the variable pressure part 7 disappears, the spring 121 or the spring 122 will make the moving part 20 return to the middle position, making the opening 19 not communicate with the pipeline 14 or the pipeline 15.

The outflow channel 6 is a channel that allows the contained product to flow out. The internal moving part 20 is provided with a pressure relief opening at the right side, which is in communication with the outflow channel 6.

For the container, steps of taking out the contained product in the container are as follows:

The operating lever 10 is pressed downwards, to make the variable pressure part 7 pressurize the pressure transfer channel 4.

The moving part 20 moves towards the outflow channel 6 under the pressure at the pressure transfer channel 4, so that the opening 19 communicates with the pipeline 15 and the contained product in the whole channel flows outwards along the outflow channel 6 (as shown in FIG. 1 and FIG. 2); a small amount of the contained product at the right side of the moving part 20 in the peripheral seal cover 13 also flows outwards along the outflow channel 6.

Variation of the location of the piston 8 is observed, pressurization stops after a required amount of the contained product is taken out, the contained product stops flowing out, the moving part 20 moves towards the pressure transfer channel 4 under the action of the spring 122 at the outflow channel 6, and the opening 19 and the pipeline 15 are disconnected (the opening 19 and the pipeline 14 are also disconnected);

The operating lever 10 is lifted up (the spring 17 has the effect of force assistance), so that the variable pressure part 7 decompresses the pressure transfer channel 4, that is, generates a negative pressure, the moving part 20 moves towards the pressure transfer channel 4, the opening 19 and the pipeline 14 are connected, and under the negative pressure, the contained product 2 enters the pressure transfer channel 4 along the internal channel 21 of the control valve 5; and a small amount of the contained product in the outflow channel 6 reflows to the right side of the moving part 20 in the peripheral seal cover 13.

After the contained product entering makes the negative pressure disappear, the spring 121 at the pressure transfer channel 14 pushes the moving part 20 to move towards the outflow channel 16, and the opening 19 and the pipeline 14 are disconnected (the opening 19 and the pipeline 15 are also disconnected).

As the piston 13 can move up and down, after the contained product in the container body 1 flows out, the piston 3 will move downwards under atmospheric pressure, until external and internal pressures in the container body 1 are equal. Consequently, external gas cannot contact the contained product in the container body 1 and the pressure channel, which will not cause pollution or oxidation to the contained product.

At this time, the container is ready for next taking-out.

Embodiment 2

Figure 4:
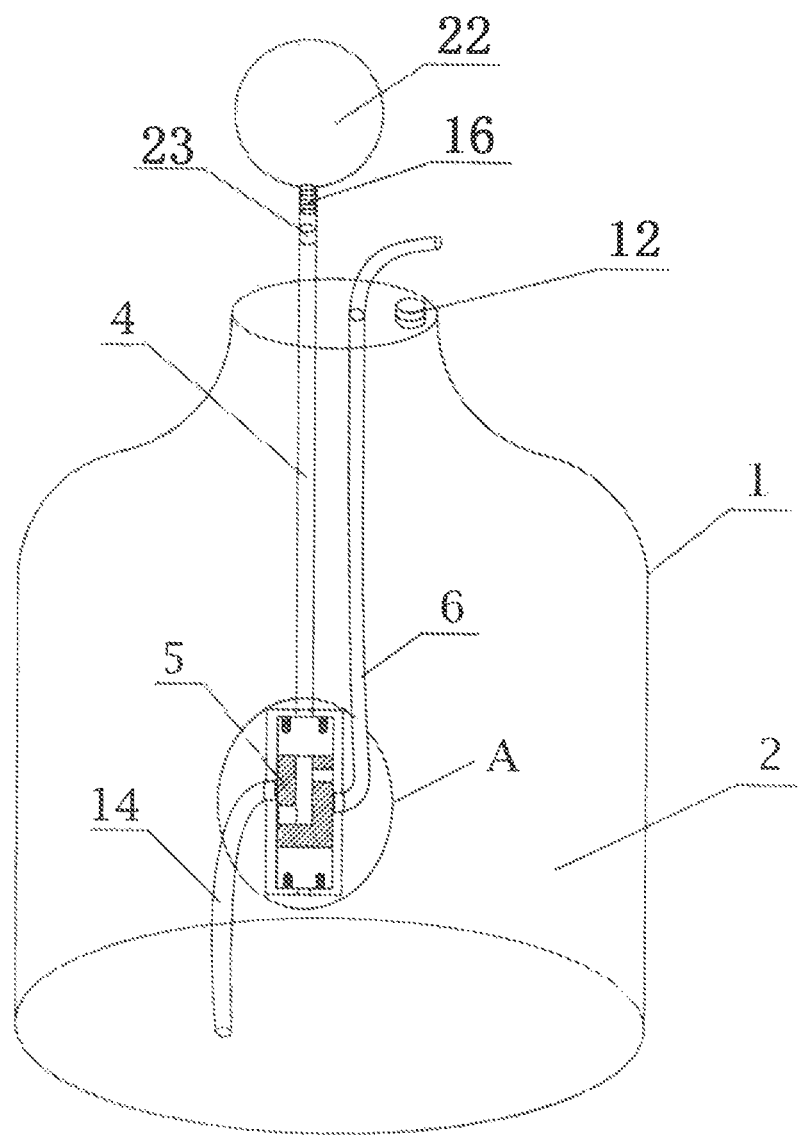
FIG. 4 is a schematic structural view of the container in Embodiment 2.
Figure 5:
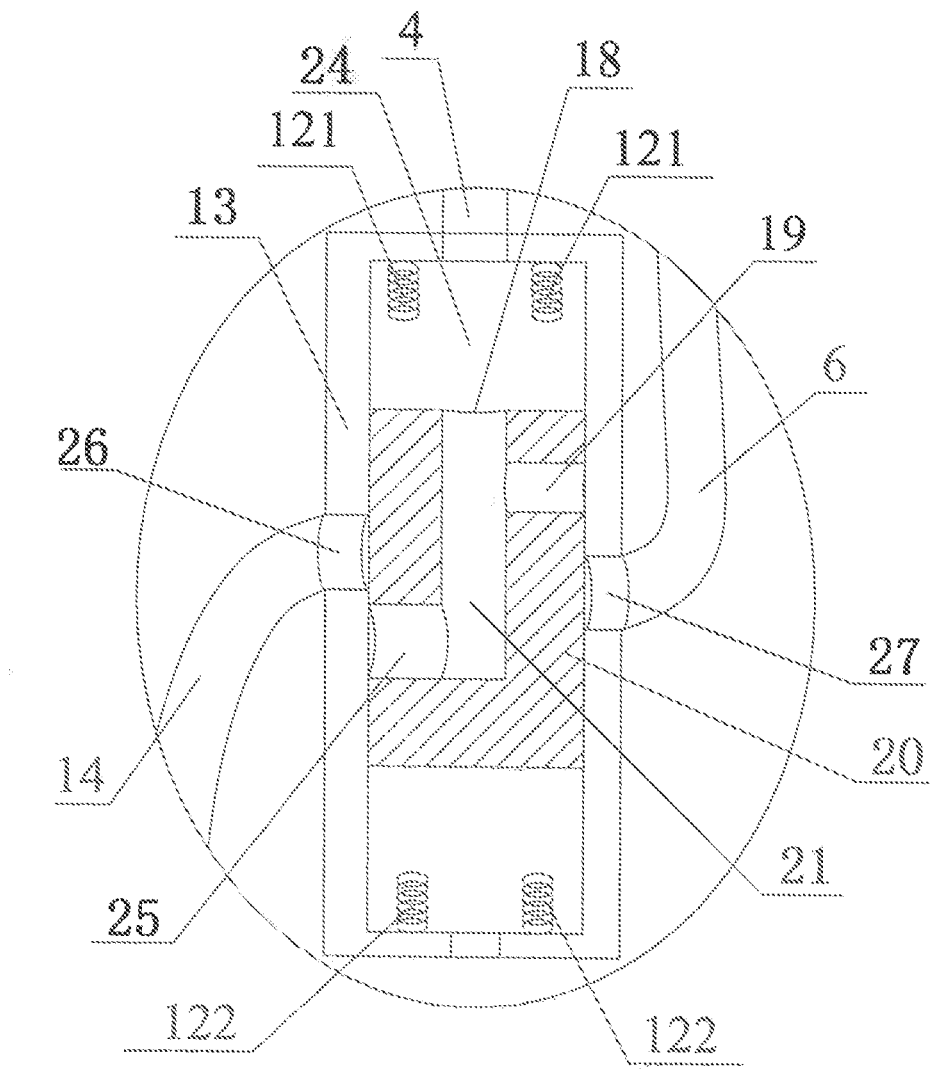
FIG. 5 is a partially enlarged view of A in FIG. 4.

As shown in FIG. 4 and FIG. 5, FIG. 4 and FIG. 5 illustrate a container according to Embodiment 2. The container includes a container body 1, an upper portion of the container body 1 has a filling port, and after the contained product 2 is filled, the filling port is sealed with the check valve 3. The check valve 3 only allows gas to enter into the container body 1.

The middle position of the container body 1 is installed with the pressure transfer channel 4 extending into its interior. The container body 1 and the pressure transfer channel 4 are airtight. The pressure transfer channel 4, at an outer end of the container body 1 through a thread 15, connects an airbag 7 having capability to recover after squeeze, and, at an inner end, communicates with the control valve 5. The pressure transfer channel 4 has a piston 10 therein, and the piston 10 separates the gas in the airbag 7 from the contained product 2 in the pressure transfer channel 4, and indicates the moving position of the contained product under pressure.

The valve body 9 of the control valve 5 is externally connected with 3 pipelines: the pipeline 14 (i.e., a liquid taking channel), the outflow channel 6 and the pressure transfer channel 4. The pipeline 14 leads to the bottom of the container body 1. The valve core 8 of the control valve 5 is located in a cavity 11 inside the valve body 9 and can slide back and forth in the cavity 11, but a peripheral side of the valve core 8 and the valve body 9 are liquid-sealed. The valve core 8 has an internal channel 13 therein, and the internal channel 13 has an opening 18 (i.e., an outer-end opening), an opening 19 (i.e., an inner-end opening) and an opening 20 (i.e., an inner-end opening). The opening 18 communicates with the pressure transfer channel 4 through the cavity 11 on the valve body 9. According to different positions where the valve core 8 slides back and forth in the valve body 9, the opening 19 and the opening 20 have three different communication relationships: only the opening 20 and the pipeline 14 are in communication (through an interface 16); the opening 20 and the pipeline 14 as well as the opening 19 and the outflow channel 6 are not in communication (the states shown in FIG. 4 and FIG. 5); only the opening 19 and the outflow channel 6 are in communication (through an interface 17). Two ends of the cavity 11 are each installed with a spring 121 and a spring 122, and the spring 121 and the spring 122 can make the valve core 8, in the absence of pressure, at a position where the opening 20 and the pipeline 14 as well as the opening 19 and the outflow channel 6 are not in communication. A lower end of the valve body 9 is provided with a pressure relief opening, and the pressure relief opening leads into the container body 1.

An outflow end of the outflow channel 6 extends out of the container body.

In the container, except the airbag 7, other parts, even if separated, may also be produced and sold as individual products and combined with the airbag 7 in use.

For the container, steps of taking out the contained product in the container are as follows:

The airbag 7 is squeezed, to pressurize the pressure transfer channel 4.

The valve core 8 of the control valve 5 moves (downwards) towards the outflow channel 6 under the pressure at the pressure transfer channel 4, so that the opening 19 communicates with the outflow channel 6 through the interface 17 and the container product in the whole channel flows outwards along the outflow channel 6.

Pressurization stops after a required amount of the contained product is taken out, the contained product stops flowing out, the valve core 8 of the control valve 5 moves towards the pressure transfer channel 4 under the action of the spring 122 at the outflow channel 6, and the opening 19 and the outflow 6 are disconnected (the opening 20 and the pipeline 14 are also disconnected).

The airbag 7 is released, the airbag 7 attempts to recover to decompress the pressure transfer channel 4, that is, to produce a negative pressure, so that the valve core 8 of the control valve 5 moves (upwards) towards the pressure transfer channel 4, the opening 20 communicates with the pipeline 14 through the interface 16, and under the negative pressure, the contained product 2 enters the pressure transfer channel 4 along the internal channel 13 of the control valve 5.

After the airbag 7 recovers, the pressure transfer channel 4 is filled with the contained product entering to make the negative pressure disappear, the spring 121 at the pressure transfer channel 4 pushes the valve core 8 of the control valve 5 to move (downwards) towards the outflow channel 6, and the opening 20 and the pipeline 14 are disconnected (the opening 19 and the outflow channel 6 are also disconnected).

The check valve 3, under the external atmosphere, makes the external gas in the container body enter into the container, until internal and external pressures of the container body 1 are equal. Because of the existence of the check valve 3, only a limited amount of outside gas can contact the contained product in the container body 1, which may reduce pollution or oxidization of the contained product.

At this time, the container is ready for next taking-out.

Embodiment 3

Figure 6:
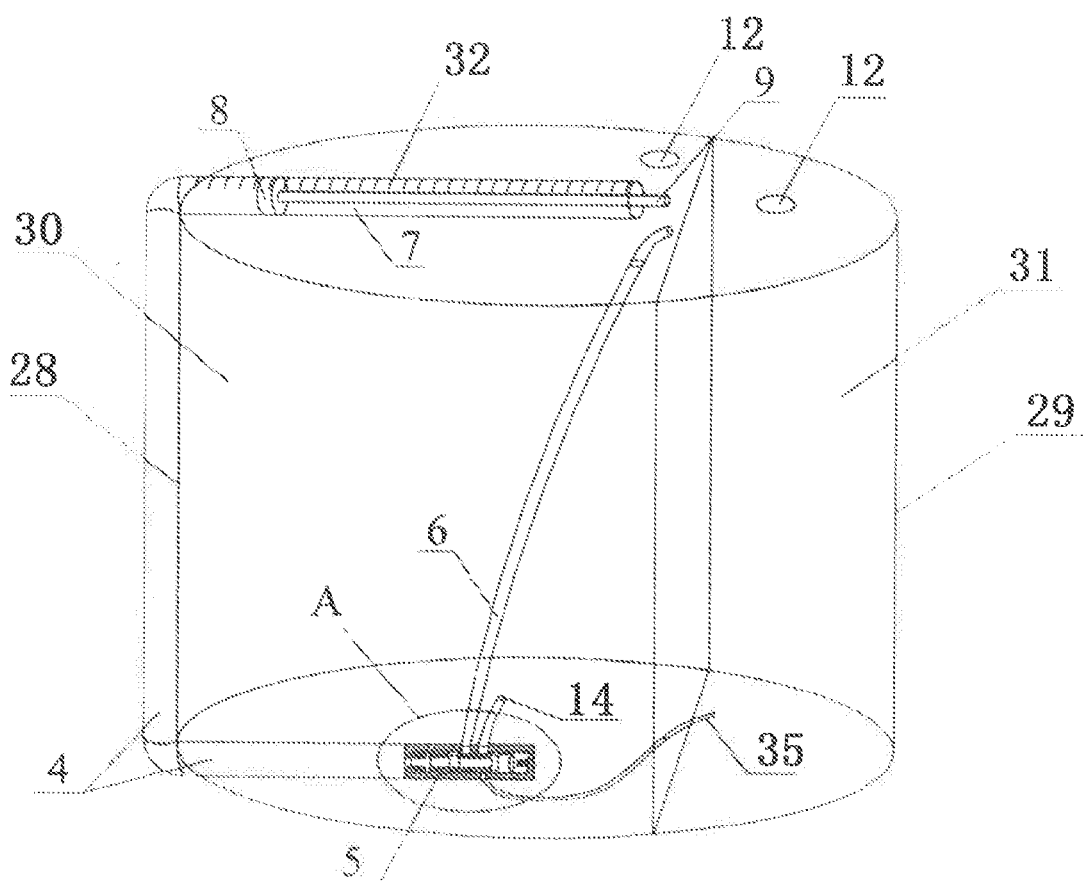
FIG. 6 is a schematic structural view of the container in Embodiment 3.
Figure 7:
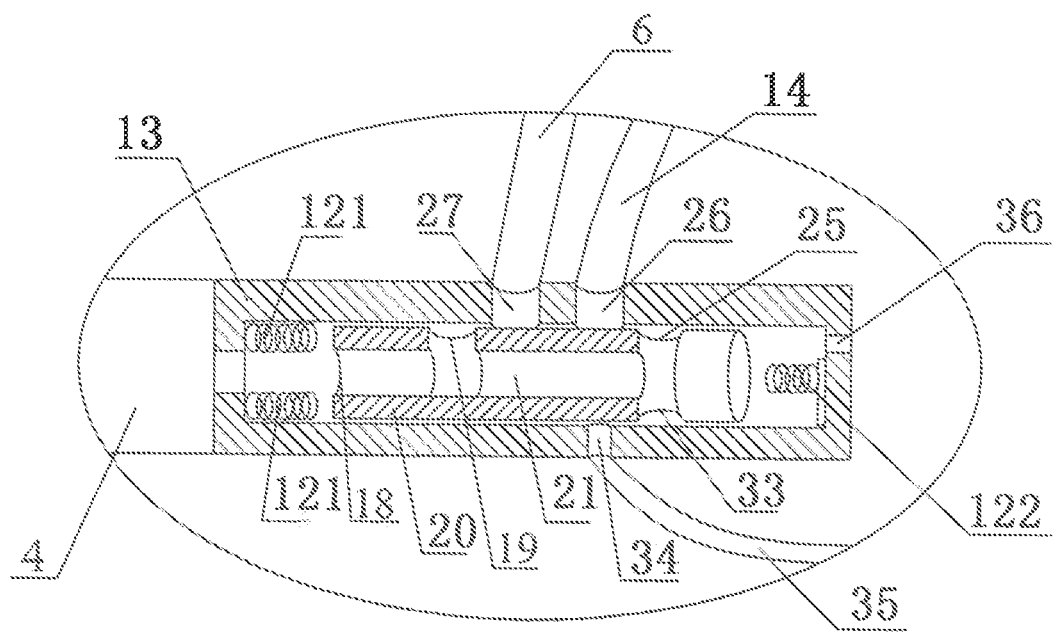
FIG. 7 is a partially enlarged view of A in FIG. 6.

As shown in FIG. 6 and FIG. 7, FIG. 6 and FIG. 7 illustrate a container according to Embodiment 3. A container body of the container includes two parts: a space 1 and a space 2, which are respectively filled with a contained product 17 and a contained product 16. After being filled with the contained products, filling ports of the space 1 and the space 2 are respectively blocked with check valves 3, and the check valves 3 only allow gas to enter into the container body 1, to prevent the contained product 16 and the contained product 17 from volatilizing outwards.

A variable pressure part 7 is located at the top of the container, including a piston 8, a pressurized bar 9 and a cylindrical object 22 with scales. The variable pressure part 7 is in communication with a pressure transfer channel 4, and the pressure transfer channel 4 is in communication with one end of a control valve 5. Good airtightness exists between the variable pressure part 7, the pressure transfer channel 4 as well as a valve body 15 of the control valve 5 and the outside.

The control valve 5 includes the valve body 15 and a valve core 14. The valve core 14 can slide left and right in the valve body 15, and a spring 12 and a spring 23 installed on the valve body 15 enable the valve core 14 to go back to the vicinity of the center after being too much off-centered. The valve core 14 has an internal channel 13 therein, and the internal channel 13 has an opening 18 (i.e., an outer-end opening), an opening 19 (i.e., inner-end opening), an opening 20 (i.e., an inner-end opening) and an opening 21 (i.e., an inner-end opening). The opening 18 is in communication with the pressure transfer channel 4 through an opening of the valve body 15. During pressurization of the variable pressure part 7, the opening 19 moves to a position where it communicates with a channel 24 (i.e., an interface) on the valve body, and the channel 24 communicates with an outflow channel 6. During decompression of the variable pressure part 7, the opening 20 and the opening 21 move to positions where they respectively communicate with a channel 25 (i.e., an interface) and a channel 26 (i.e., an interface) on the valve body. The channel 25 and the channel 26 respectively communicate with a pipeline 10 (i.e., a liquid taking channel) and a pipeline 11 (i.e., a liquid taking channel). The pipeline 10 and the pipeline 11 respectively communicate with the bottom of the space 1 and the bottom of the space 2. In the absence of pressurization and decompression of the variable pressure part, under the action of the spring 12 and the spring 23, the opening 19, the opening 20 and the opening 21 do not communicate with the corresponding pipelines outside the valve body. A width ratio of the opening 25 to the opening 26 is correlated with a volume ratio of the space 1 to the space 2, and their opening positions are located on the same cross section of the control valve 5. An opening 27 (i.e., a pressure relief opening) aims at enabling the valve core 14 to move left and right smoothly.

For the container, steps of taking out the contained product in the container are as follows:

An operating lever 9 is pressed to the left, to make the variable pressure part 7 pressurize the pressure transfer channel 4.

The valve core 14 of the control valve 5 moves towards the outflow channel 6 under pressure at the pressure transfer channel 4, so that the opening 19 communicates with the outflow channel 6 through the channel 24 and the contained product in the whole channel flows outwards along the outflow channel 6.

Figure 8:
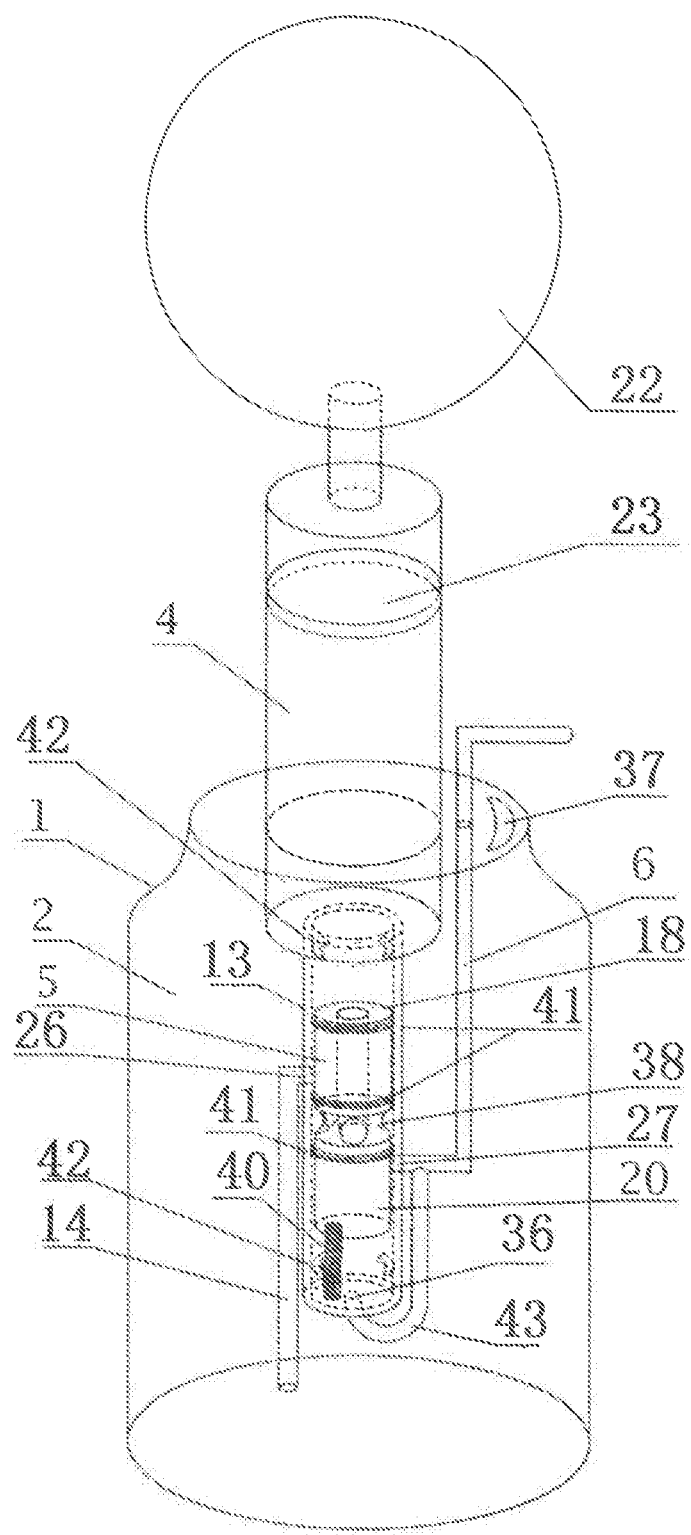
FIG. 8 is a schematic structural view of the container in Embodiment 4.

Variation of the location of the piston 8 is observed, pressurization stops after a required amount of the contained product is taken out, and the contained product stops flowing out, the valve core 14 moves towards the pressure transfer channel 4 under the action of the spring 12, and the opening 19 and the channel 24 are disconnected (as shown in FIG. 7 and FIG. 8, the opening 20 and the channel 25 as well as the opening 21 and the channel 26 are also disconnected).

The operating lever 9 is pulled to the left, so that the variable pressure part 7 decompresses the pressure transfer channel 4, that is, generate a negative pressure, the valve core 14 moves towards the pressure transfer channel 4, and the opening 20 and the channel 25 as well as the opening 21 and the channel 26 are connected; under the negative pressure, the contained product 17 and the container product 16 enter the control valve 5 respectively through the pipeline 10 and the pipeline 11, and then enter the pressure transfer channel 4; and the volume ratio between the contained products entering is positively correlated with the width ratio of the opening 25 to the opening 26.

After the contained product entering makes the negative pressure disappear, the spring 23 pushes the valve core 14 to move towards the other side, and the opening 19 and the channel 24, the opening 20 and the channel 25 as well as the opening 21 and the channel 26 are disconnected (as shown in FIG. 7 and FIG. 8).

The check valves 3 makes gas with a volume the same as that of the outflow liquid enter the space 1 and the space 2 respectively, until internal and external pressures of the container body 1 are equal. Accordingly, only a limited amount of outside gas can contact the contained products in the space 1 and the space 2, which will not cause pollution or oxidization to the contained products.

At this time, the container is ready for next taking-out.

Embodiment 4

Figure 9:
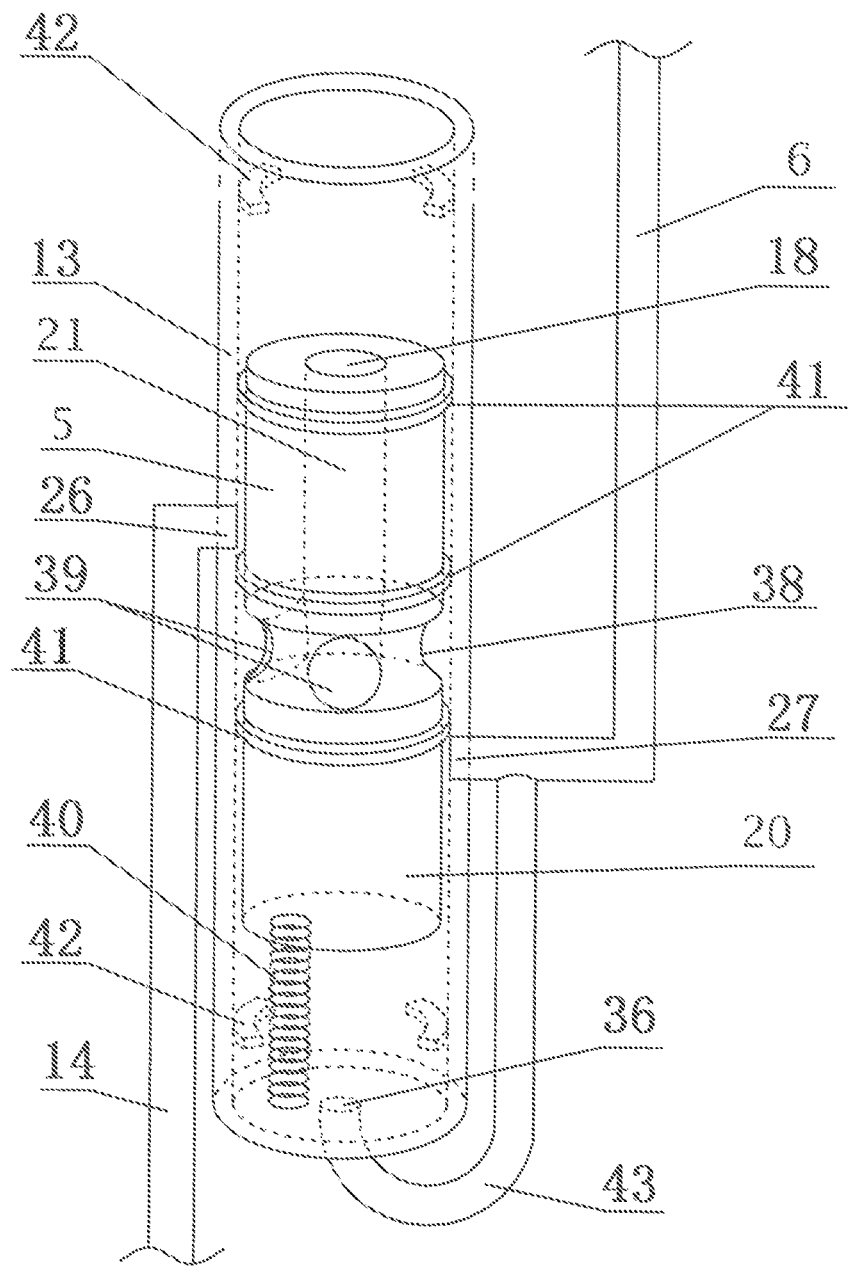
FIG. 9 is a partially enlarged view of the control valve in FIG. 8.

As shown in FIG. 8 and FIG. 9, FIG. 8 and FIG. 9 illustrate a container according to Embodiment 4. The container includes a container body 1 receiving a contained product 2 internally. An upper surface of the container body 1 has a filling port 3. A pressure transfer channel 4 is further fixed to the upper surface of the container body 1. An airbag 7 is used for applying a positive pressure and a negative pressure to the pressure transfer channel. The pressure transfer channel 4 is internally provided with a piston 8, and the piston 8 can separate the gas in the airbag 7 from the liquid contained product in the pressure transfer channel 4 and move up and down in the pressure transfer channel 4 along with variation of the positive and negative pressures is.

A lower end of the pressure transfer channel 4 is in communication with a control valve 5. The control valve 5 includes a valve body 19 and a valve core 20. The valve core 20 can move up and down in the valve body 19. The valve core 20 is internally provided with an internal channel 21. An outer-end opening 12 of the internal channel 21 can communicate with the pressure transfer channel 4, and an inner-end opening is an annular slot 13 disposed on an outer peripheral face of the valve core. The part of the internal channel 21 in communication with the annular slot 13 has two branch channels 22. Sidewalls of the valve body 19 are provided with an interface 14 and an interface 15 penetrating the sidewalls, where, on an outer side of the valve body 19, the interface 14 is in communication with an outflow channel 6, and the interface 15 is in communication with a liquid taking channel 9. The outflow channel 6 leads to the outside of the container body 1, and the liquid taking channel 9 leads to the bottom inside the container body 1.

The control valve 5 is internally provided with a spring 17, and the spring 17 enables the valve core 20 to bounce up to go back to a middle position where the annular slot 13 and the interface 14 are no longer in communication. On two sides of the annular slot and an upper portion of the valve core are seal rings 16, which prevent contained products from leaking and passing between an outer side face of the valve body 19 and an outer side face of the valve core 20. The valve body 19 is internally provided with baffles 11. The positions of the baffles 11 are the position of an upper surface of the valve core 20 when the annular slot 13 communicates with the interface 15 and the position of a lower surface of the valve core 20 when the annular slot 13 communicates with the interface 14.

A lower surface of the valve body 19 is provided with a pressure relief opening 10, and the pressure relief opening 10 leads into the outflow channel 6 through a pipeline 18. During pressurization, the contained product in a lower space of the valve body 19 is discharged outwards from the outflow channel 6 through the pressure relief opening 10 and the pipeline 18; during resetting or decompression of the valve core 20, the contained product in the outflow channel 6 flows back to the lower space of the valve body 19 through the pipeline 18 and the pressure relief opening 10.

The airbag 7 may also have a port in communication with the outer atmosphere, and the port is provided with a valve having a switch function. When the presence of a large amount of gas results in that the piston 8 cannot return to the initial position, the switch of the port is opened to squeeze the airbag 7, and the switch of the port is closed to release the airbag 7, and then the piston 8 can return to the initial position.

For the container, steps of taking out the contained product in the container are as follows:

The airbag 7 is squeezed, to make the variable pressure part 7 pressurize the pressure transfer channel 4.

The valve core 20 of the control valve 5 moves downwards under pressure at the pressure transfer channel 4, so that the annular slot communicates with the outflow channel 6 through the interface 14 and the contained product in the whole channel flows outwards along the outflow channel 6; and the lower baffle 11 blocks the valve core 20 from continuously moving downwards.

Variation of the location of the piston 8 is observed, pressurization stops after a required amount of the contained product is taken out, and the contained product stops flowing out. The valve core 20 moves upwards under the action of the spring 17, and the annular slot 13 and the channel 14 are disconnected from each other (as shown in FIG. 8 and FIG. 9, the annular slot 13 is disconnected from the channel 14 and the channel 15).

The airbag 7 is released, the airbag 7 recovers, and the variable pressure part 7 decompresses the pressure transfer channel 4, that is, produce a negative pressure, so that the valve core 20 moves upwards, and the annular slot 13 and the interface 15 communicate with each other; under the negative pressure, the contained product 2 enters into the internal channel 21 through the liquid taking channel 9 and the interface 15 and then enters into the pressure transfer channel 4. The upper baffle 11 blocks the valve core 20 from continuously moving upwards.

After the contained product entering makes the negative pressure disappear, the valve core 20 moves downwards under the action of gravity, and the annular slot 13 is also disconnected from the interface 14 and the interface 15 (as shown in FIG. 8 and FIG. 9).

At this time, the container is ready for next taking-out.

Although the embodiments of the present invention have been illustrated and described above, it would be understood by persons of ordinary skill in the art that various variations, modifications, replacements, transformations and combinations can be made to the embodiments without departing from the principle and spirit of the present invention. The scope of the present invention is defined by the appended claims and equivalents thereof.

What is claimed is:

1. A container, comprising a container body, characterized by further comprising a pressure transfer channel, a control valve, a liquid taking channel and an outflow channel;

the pressure transfer channel transferring to the control valve variation of positive and negative pressures applied to the pressure transfer channel by an external variable pressure part;

the control valve comprising a valve body and a valve core, and under the positive and negative pressures, the valve core axially reciprocating in the valve body;

one end of the valve body being in communication with the pressure transfer channel, the other end being provided with a pressure relief opening, and sidewalls being provided with at least two interfaces; outer sides of the interfaces being respectively in communication with the outflow channel and the liquid taking channel, and inner sides leading to an outer side face of the valve core;

the valve core being provided with an internal channel, an outer-end opening of the internal channel being in communication with the pressure transfer channel, and an inner-end opening being located on the outer side face of the valve core;

the valve core, under the positive pressure, moving to a position where interfaces through which the inner-end opening is in communication with the outflow channel are connected, under the negative pressure, moving to a position where interfaces through which the inner-end opening is in communication with the liquid taking channel are connected, and in the absence of pressure, moving to a position where the inner opening and interfaces on the valve body are not connected;

one end of the liquid taking channel being in communication with the corresponding interface on the valve body, and the other end leading to the bottom inside the container body; and one end of the outflow channel being in communication with the corresponding interface on the valve body, and the other end leading to the outside of the container body.

2. The container according to claim 1, characterized in that: the body of the pressure transfer channel is located outside the container body or on an outer wall, and a channel wall is a transparent wall marked with scales thereon.

3. The container according to claim 1, characterized in that: internal diameters of the internal channel, the interfaces and the liquid taking channel or the outflow channel are substantially the same.

4. The container according to claim 1, characterized in that: the container body has a plurality of spaces therein, respectively containing different contained products; each space is in communication with the corresponding interface on the valve body through a respective liquid taking channel; and the interfaces in communication with the liquid taking channel are located on the same radial plane.

5. The container according to claim 1, characterized in that: the inner-end opening of the valve core is an annular slot.

6. The container according to claim 1, characterized in that: the control valve is internally provided with an elastic part, and the elastic part enables the valve core to return to the position where the inner-end opening of the valve core and the interfaces on the valve body are not connected.

7. The container according to claim 6, characterized in that: the elastic part is a spring located at an end portion of the valve core.

8. The container according to claim 1, characterized in that: the valve body is internally provided with a blocking device, to block the valve core from continuously moving after the inner-end opening communicates with the corresponding interface due to the positive and negative pressures.

9. The container according to claim 1, characterized in that: the pressure relief opening leads to the outflow channel.

10. The container according to claim 1, characterized in that: the variable pressure part is an airbag with a springback function or a piston that can be pushed or pulled in the pressure transfer channel.

11. A method for taking out a contained product in a container, a containing device used comprising a variable pressure part, a pressure transfer channel, a control valve, a liquid taking channel and an outflow channel, wherein the variable pressure part, the pressure transfer channel and the control valve are in communication with each other in sequence, and the liquid taking channel and the outflow channel are connected with side faces of the control valve; the method comprising:
- A. pressurizing the pressure transfer channel by using the variable pressure part, to push a valve core in a valve body to move, so that the control valve communicates with the pressure transfer channel and the outflow channel and the contained product in the pressure transfer channel and the control valve flows outwards along the outflow channel;
- B. stopping pressurizing after a required amount of the contained product is taken out, and the contained product stopping flowing out;
- C. making the valve core in the control valve return to a position where the pressure transfer channel and the outflow channel as well as the liquid taking channel and the pressure transfer channel are disconnected;
- D. decompressing the pressure transfer channel by using the variable pressure part, to push the valve core in the valve body to move, so that the pressure transfer channel communicates with the liquid taking channel and the contained product in the container body flows out into the pressure transfer channel;
- E. after decompression is stopped, the contained product in the container body stopping flowing out into the pressure transfer channel; and
- F. making the valve core in the control valve return to the position where the pressure transfer channel and the outflow channel as well as the liquid taking channel and the pressure transfer channel are disconnected.

12. The method according to claim 11, characterized in that: steps C, D, E, and F are automatically completed after completion of steps A and B.

* * * * *